United States Patent [19]

Everts et al.

[11] Patent Number: 4,664,787
[45] Date of Patent: May 12, 1987

[54] METHOD OF SUPPLYING OF HOT SOLID PARTICLES TO A RETORTING VESSEL FOR THE EXTRACTION OF HYDROCARBONS FROM A HYDROCARBON-CONTAINING SUBSTRATE

[75] Inventors: Rudi Everts; Pieter A. Kalisvaart, both of The Hague, Netherlands

[73] Assignee: Shell Internationale Research Maatschappij B.V., Netherlands

[21] Appl. No.: 813,441

[22] Filed: Dec. 26, 1985

[30] Foreign Application Priority Data

Jan. 25, 1985 [GB] United Kingdom ............... 8501921

[51] Int. Cl.$^4$ ............................................. C10G 1/00
[52] U.S. Cl. ..................................... 208/410; 201/31
[58] Field of Search ............. 208/8 R, 11 R, DIG. 1, 208/410; 202/25, 254, 255, 256, 262, 108, 116, 129; 406/118, 119, 168, 45, 46; 201/31; 34/58 A

[56] References Cited

U.S. PATENT DOCUMENTS

| | | | |
|---|---|---|---|
| 3,118,741 | 1/1964 | Faulk | 208/11 R |
| 4,115,070 | 9/1978 | Jukkola et al. | 406/168 X |
| 4,419,215 | 12/1983 | Voetter et al. | 208/11 R |
| 4,432,861 | 2/1984 | Wallman | 208/11 R |
| 4,439,306 | 3/1984 | Voetter et al. | 208/11 R |
| 4,456,525 | 6/1984 | Spars et al. | 208/11 R |
| 4,481,080 | 11/1984 | Mallon | 208/11 R X |

*Primary Examiner*—Glenn Caldarola
*Attorney, Agent, or Firm*—Jones, Tullar & Cooper

[57] ABSTRACT

A method for the supply of hot solid particles, preferably hot spent substrate particles, to a retorting vessel for the extraction of hydrocarbons from a hydrocarbon-containing substrate according to which hot solid particles are supplied to a slide situated at an angle to the horizontal plane, fluidization gas is supplied to the fluidization means of the slide, which fluidization gas is passed through the fluidization means causing fluidization of the hot solid particles on the slide and displacement of the hot fluidized particles along the slide, at least one draw-off vessel is situated between the slide and retorting vessel which is filled with hot fluidized particles from the slide, and fluidization gas is passed through fluidization means of each filled draw-off vessel causing the hot solid particles therein to flow into a respective inlet of the retorting vessel.

3 Claims, 2 Drawing Figures

METHOD OF SUPPLYING OF HOT SOLID PARTICLES TO A RETORTING VESSEL FOR THE EXTRACTION OF HYDROCARBONS FROM A HYDROCARBON-CONTAINING SUBSTRATE

The present invention relates to a process and apparatus for the extraction of hydrocarbons from a hydrocarbon-containing substrate, such as oil shale, tar sand or a bituminous coal, by heating hydrocarbon-containing substrate particles in the substantial absence of oxygen at a temperature of at least 400° C. to give a coke-bearing spent substrate and liberated hydrocarbons and recovering the liberated hydrocarbons.

In a known process of this kind, carried out in a retorting vessel, the hydrocarbon-containing substrate particles are passed through a plurality of stages, wherein in at least some of said stages the hydrocarbon-containing substrate particles are mixed with hot solid particles, preferably hot spent substrate particles, in order to heat the hydrocarbon-containing substrate particles, the mixture is maintained in a fluidized condition and the liberated hydrocarbons are recovered.

The hot solid particles used are preferably hot spent substrate particles obtained by the separate combustion of the coke bearing spent substrate particles in a suitable combustor.

In the above known process and apparatus, which is described for example in U.S. Pat. specification No. 4,439,306 published on Mar. 29, 1984, the hot solid particles are separately supplied to some or all of the said stages.

The invention relates to an improved apparatus for the supply of the hot solid particles to the said retorting vessel, which comprises according to the invention a slide arranged at an angle (for example at an angle of 5° to 10°) to the horizontal plane said slide having a bottom and fluidization means in or close to the bottom, means for the supply of fluidization gas to the fluidization means of the slide, a draw-off vessel below the slide, which draw-off vessel is in communication with the slide and with a corresponding inlet for hot solid particles of the retorting vessel, fluidization means in the draw-off vessel and means for the supply of fluidization gas to the fluidization means of the draw-off vessel.

An advantage of this apparatus according to the invention is that it does not comprise any moving parts, so that a reliable transport of the hot solid particles is ensured.

Normally, the apparatus according to the invention comprises a plurality of draw-off vessels arranged below the slide, wherein each draw-off vessel is in communication with the slide and with a corresponding inlet for hot solid particles of the retorting vessel, and wherein the fluidization means of each draw-off vessel are connected to the means for the supply of fluidization gas to the said fluidization means.

A particularly attractive embodiment of the apparatus according to the invention comprises a temperature measuring device arranged in a compartment in the retorting vessel containing a fluidized bed of substrate particles during normal operation and adapted to produce a signal corresponding to the temperature measured in the said fluidized bed, means for transferring the signal obtained to a control device for controlling the quantity of fluidization gas supplied to the fluidization means of a corresponding draw-off vessel, so as to control the quantity of hot solid particles passing from the draw-off vessel into the corresponding inlet of the retorting vessel.

By means of this embodiment, the temperature of the hydrocarbon-containing substrate particles in the various compartments of the retorting vessel can be regulated in an extremely simple and effective manner.

The invention relates as well to a method for the supply of hot solid particles, preferably hot spent substrate particles, to a retorting vessel by means of the apparatus according to the invention.

BRIEF DESCRIPTION OF THE DRAWINGS

The invention will now be described with reference to the drawings, wherein.

Figure 1:
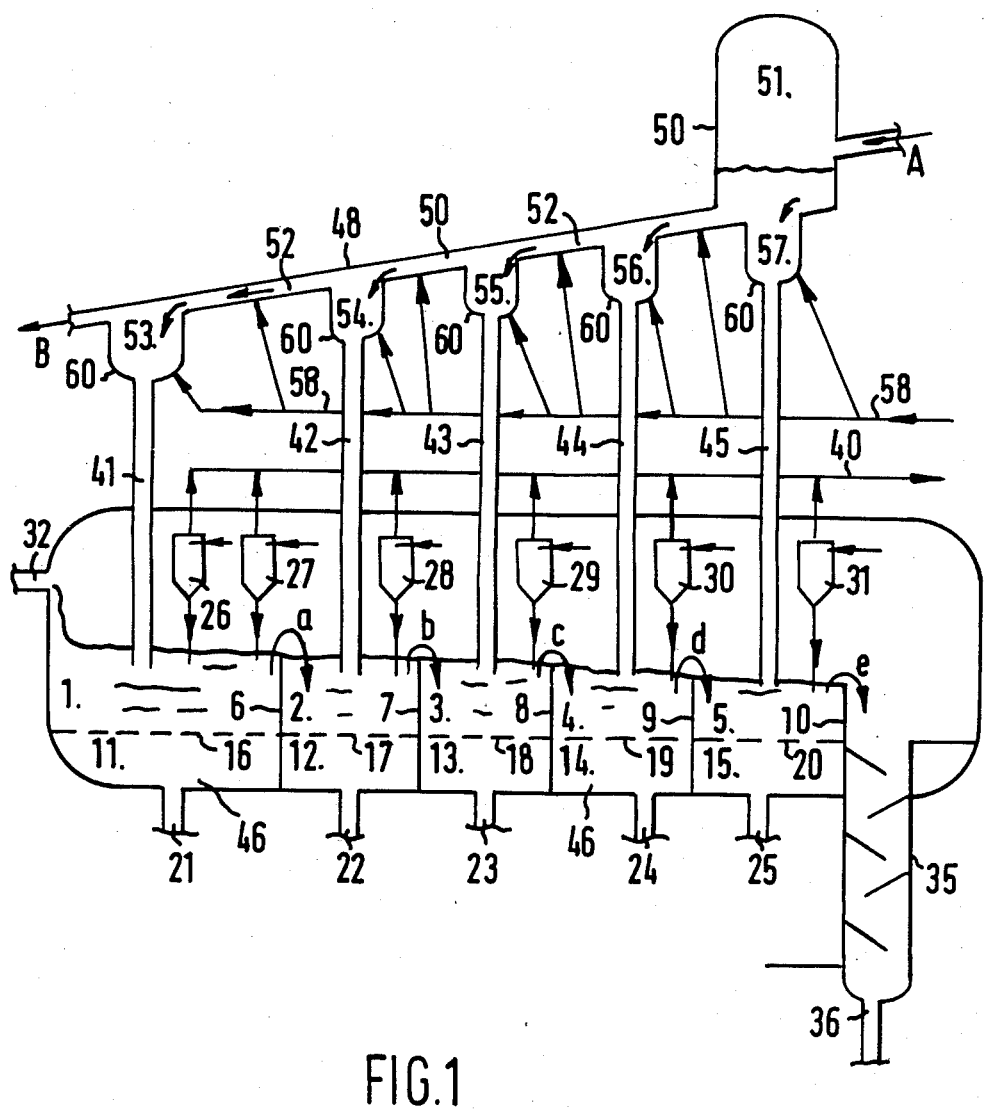
FIG. 1 shows schematically a vertical cross-section of a retorting vessel together with an appararuts according to the invention for the supply of hot solid particles to the retorting vessel.

The retorting vessel 46 as shown in FIG. 1 comprises a number of compartments 1, 2, 3, 4 and 5 which are arranged in series and which are separated from each other by weirs 6, 7, 8, 9. Below compartments 1, 2, 3, 4, and 5, corresponding gas supply chambers are present which are indicated by reference numerals 11, 12, 13, 14 and 15. Each compartment 1, 2, 3, 4 and 5 is separated from each corresponding gas supply chamber 11, 12, 13, 14 and 15 by respectively a corresponding perforated or porous plate 16, 17, 18, 19 and 20. Furthermore each gas supply chamber 11, 12, 13, 14 and 15 is provided respectively with a corresponding gas inlet 21, 22, 23, 24 and 25.

Above each compartment 1, 2, 3, 4 and 5 conventional cyclones 26, 27, 28, 29, 30 and 31 are present. Furthermore each compartment 1, 2, 3, 4 and 5 is provided respectively with a corresponding inlet 41, 42, 43, 44 and 45 for the supply of hot solid particles, preferably hot spent substrate particles, to the various compartments 1, 2, 3, 4 and 5. These inlets 41, 42, 43, 44 and 45 are each connected to the apparatus 50 for the supply of hot solid particles to the retorting vessel 46.

One side of the retorting vessel 46 is provided with an inlet 32 for the supply of fresh hydocarbon-containing substrate particles to be treated in the retorting vessel 46. The reference numberal 35 indicates a steam stripper which is provided with an outlet 36.

Figure 2:
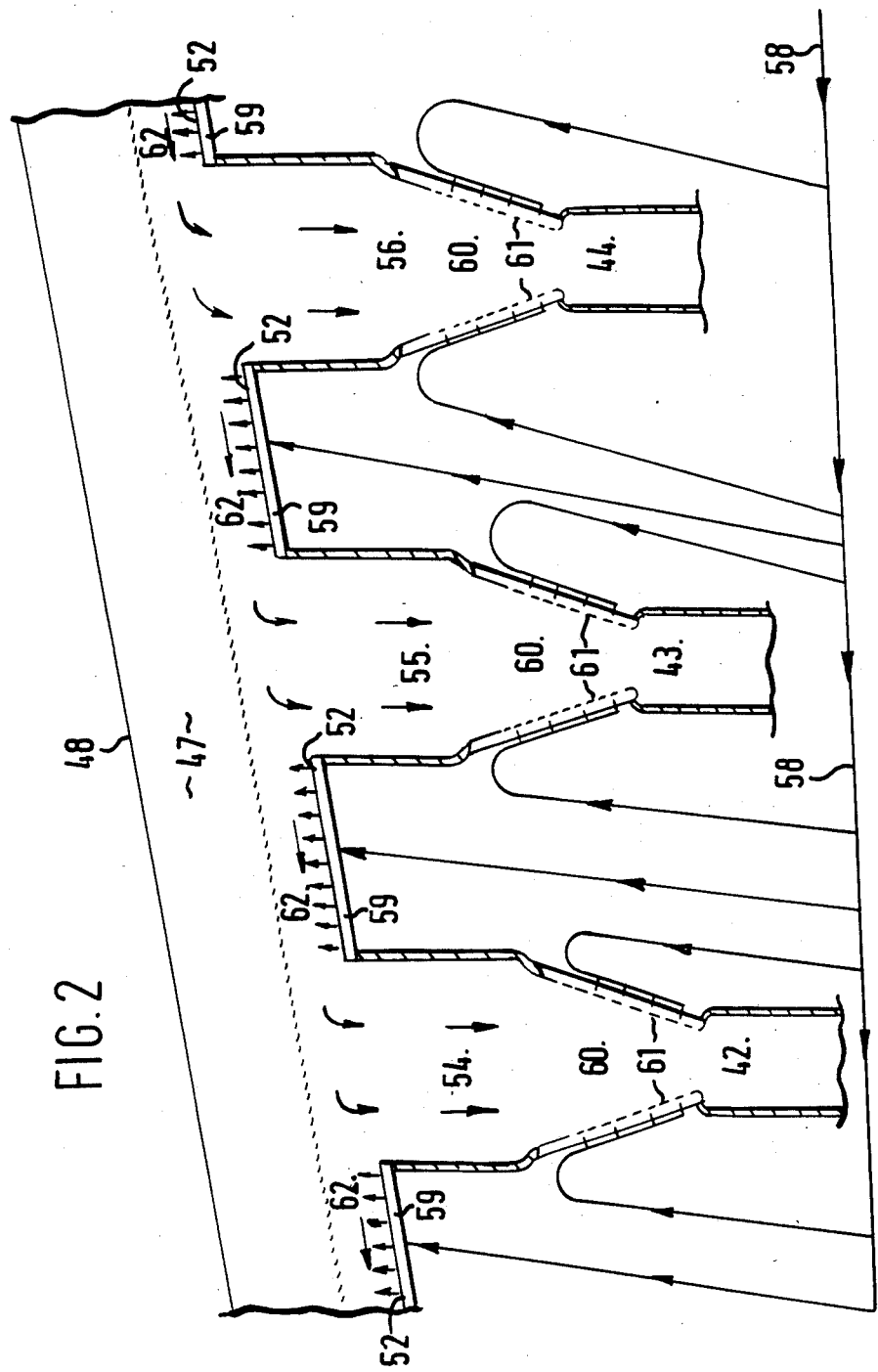
FIG. 2 shows schematically a vertical cross-section on an enlarged sale of a fragment of the apparatus for the supply of hot solid particles to the retorting vessel.

The apparatus 50 for the supply of hot solid particles, preferably hot spent substrate particles, to the retorting vessel 46, will now be described with reference to FIGS. 1 and 2.

The apparatus 50 comprises a slide 52 which is connected to a distribution vessel. The slide 52 is preferably provided with two side walls 47 and a top wall 48 so that the slide is closed and dusting is prevented. Furthemore, since the particles to be transported along the slide 52 are very hot, it is preferred to provide the slide 52 and the walls 47 and 48 with heat-insulating material to reduce the loss of heat. The vessel is provided with an inlet A for the supply of hot solid particles. If desired two or more parallel slides 52 can be used, for example three parallel slides 52, which are each connected to the distribution vessel 51. The, or each, slide 52 is arranged above the retorting vessel 46 as shown in FIG. 1 and is provided with a number of draw-off vessels 53, 54, 55, 56. Furthermore a draw off vessel 57 is arranged below the distribution vessel 51. The draw-off vessels 53, 54, 55, 56 and 57 are basically of similar construction.

The slide 52 is provided with suitable fluidization means, for example a perforated or a porous bottom 59 which is connected to a gas supply line 58. The lower part 60 of each draw-off vessel 53, 54, 55, 56, 57 is conical. Each conical part 60 is provided with suitable fluidization means, for example perforated or porous walls 61 which are connected to the gas supply line 58.

The conical parts 60 of the draw-off vessels 53, 54, 55, 56 and 57 are respectively connected to the inlets for the hot solid particles 41, 42, 43, 44 and 45.

The operation of the apparatus according to the invention will now be explained with reference to FIGS. 1 and 2.

For the sake of simplicity, it will be assumed that the hydrocarbon-containing substrate to be treated is oil shale and that the hot solid particles used for heating the oil shale are hot spent oil shale particles supplied from a suitable combustor for combusting coke-bearing spent oil shale particles.

During normal use of the retorting vessel 46 as shown in FIG. 1, fresh preheated oil shale particles (of a size preferably less than 3 mm) are supplied to the retorting vessel 46 through inlet 32. At the same time hot spent oil shale particles are supplied via the supply apparatus 50 through inlets 41, 42, 43, 44 and 45 to the respective compartments 1, 2, 3, 4 and 5. An inert gas, for example steam, is supplied to each gas supply chamber 11, 12, 13, 14 and 15 through the respective gas inlets 21, 22, 23, 24 and 25. From the various gas supply chambers 11, 12, 13, 14, 15, the steam passes through the respective perforated or porous plates 16, 17, 18, 19 and 20 into the respective compartments 1, 2, 3, 4 and 5 so as to cause fluidization of the mass of oil shale particles present in each compartment 1, 2, 3, 4 and 5.

The fluidization of the mass of oil shale particles in each compartment 1, 2, 3, 4 and 5 causes an intensive mixing of the oil shale particles and an excellent transfer of heat from the very hot spent oil shale particles to the fresh oil shale particles. The heating of the fresh oil shale particles causes the liberation of hydrocarbons from the fresh oil shale particles. The liberated gaseous hydrocarbons, which are the desired product, together with steam, are passed via the cyclones 26, 27, 28, 29, 30, 31 to a product outlet 40 to be treated further, if necessary. In these cyclones, oil shale particles entrained by the liberated gaseous hydrocarbons and the steam are separated and passed back to the compartments 1, 2, 3, 4 and 5.

The fluidized oil shale particles pass from compartment 1 over weir 6 (see arrow a) into compartment 2, thence via weir 7 (see arrow b) into compartment 3, thence via weir 8 (see arrow c) into compartment 4, thence via weir 9 (see arrow d) into compartment 5 and finally from compartment 5 over weir 10 (see arrow e) into stream stripper 35. In order to enable the mass of fluidized oil shale particles to move smoothly from one compartment to another, the successive weirs 6, 7, 8, 9 and 10 are each lower than an adjacent preceding weir as shown in FIG. 1. In the steam stripper 35 final traces of product are removed from the oil shale particles, whereafter these particles are passed to the outlet 36 of the steam stripper 35. The particles leaving the steam stripper 35, which comprise a large quantity of spent coke-bearing oil shale particles, are supplied to a suitable combustor to produce heat and hot spent oil shale particles.

The apparatus 50 for the supply of the hot spent oil shale particles to the retorting vessel 46 will now be discussed in detail with reference to FIG. 2.

Hot spent oil shale particles from the combustor enter into the distribution vessel 51 though inlet A and pass to the slide 52, or if there are a plurality of parallel slides 52 to all the slides connected to the distribution vessel 51. The angle of the slide 52 (or slides 52) to the horizontal plane need only be small, for example only 5° to 10°, since fluidization gas, for example steam, is supplied to the slide 52 through the gas supply line 58 and through the fluidization means, viz. the perforated or the porous bottom 59 of the slide 52. This fluidization gas causes fluidization of the hot spent oil shale particles 62 present on the slide 52 and consequent displacement of these particles along the slide 52.

The fluidized hot spent oil shale particles flow into the various draw-off vessels 53, 54, 55, 56 and furthermore hot spent oil shale particles flow directly from distribution vessel 51 into the draw-off vessel 57.

The draw-off vessels 53, 54, 55, 56 and 57 are continuously filled with the hot spent oil shale particles and in the draw-off vessels 53, 54, 55 and 56 degasification of the mass of hot spent oil shale particles takes place. In order to achieve sufficient degasification of said mass in the draw-off vessels a certain residence time of the hot spent oil shale particles in the draw-off vessels is required.

In order to obtain a desired flow of hot spent oil shale particles from each draw-off vessel 53, 54, 55, 56 and 57 into each corresponding inlet 41, 42, 43, 44 and 45 gas, for example steam, is passed through supply line 58 and though the fluidization means, viz. the perforated or porous walls 61 of the conical parts 60 of the various draw-off vessels.

Mass flow of the hot spent oil shale particles from each draw-off vessel into the retorting vessel 46 can be controlled by the quantity of gas, for example steam, supplied to the perforated or porous walls 61 of the corresponding draw-off vessels. It is for example possible to install a temperature measuring control loop in each compartment 1, 2, 3, 4 and 5, which will monitor the temperature of the fluidized bed in each compartment 1, 2, 3, 4 and 5. The temperature signals obtained can be used as input to control the amount of gas, for example steam, to be supplied to the perforated or porous walls 61 of each corresponding draw-off vessel. In this manner the flow of hot spent oil shale particles to each compartment 1, 2, 3, 4 and 5 can be controlled in dependence of the temperature of the fluidized bed in the corresponding compartment 1, 2, 3, 4 and 5.

Any hot spent oil shale particles remaining (see arrow B) are passed for example to a preheater for preheating fresh oil shale particles before they are supplied to the inlet 32 of the retorting vessel 46.

The fluidization means used in combination with the slide 52, the draw-off vessels 53, 54, 55, 56 and 57 and the retorting vessel 46 are preferably perforated or porous plates. The porous plates are for example made of a porous sintered metal or of a porous ceramic material. It is however possible to use instead fluidization means built up of a plurality of tubes provided with a large number of openings to obtain a good distribution of the fluidization gas.

We claim:
1. A method for the supply of hot solid particles, preferably hot spent substrate particles, to a retorting vessel for the extraction of hydrocarbons from a hydrocarbon-containing substrate, comprising the steps of:
providing a slide arranged at an angle to the horizontal plane with a bottom and fluidization means associated with the bottom;
supplying hot solid particles to the slide;
supplying fluidization gas to the fluidization means of the slide and passing the fluidization gas through the fluidization means causing fluidization of the hot solid particles on the slide and displacement of the hot fluidized particles along the slide;
providing at least one draw-off vessel arranged below the slide and in communication therewith and with a respective inlet to the retorting vessel, each draw-off vessel having fluidization means associated therewith;
filling of the draw-off vessels from the slide with the hot fluidized particles; and
passing fluidization gas through the fluidization means of the draw-off vessel causing the hot solid particles therein to flow into a respective inlet of the retorting vessel.

2. The method as defined in claim 1, wherein the slide is arranged at an angle of between 5° and 10° to the horizontal plane.

3. The method as defined in claim 1, further comprising the steps of:
measuring the temperature of a fluidized bed of substrate particles in a compartment of the retorting vessel; and
controlling the quantity of fluidization gas supplied to the fluidization means of a corresponding draw-off vessel as a function of the measured temperature, thereby causing a quantity of hot solid particles to pass from the draw-off vessel into the corresponding inlet of the retorting vessel.

* * * * *